(12) United States Patent
Kafai et al.

(10) Patent No.: US 11,144,793 B2
(45) Date of Patent: Oct. 12, 2021

(54) INCREMENTAL CLUSTERING OF A DATA STREAM VIA AN ORTHOGONAL TRANSFORM BASED INDEXING

(71) Applicant: Hewlett Packard Enterprise Development LP, Houston, TX (US)

(72) Inventors: Mehran Kafai, Palo Alto, CA (US); Kyriaki Dimitriadou, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 455 days.

(21) Appl. No.: 16/073,921

(22) PCT Filed: Dec. 4, 2015

(86) PCT No.: PCT/US2015/064013
§ 371 (c)(1),
(2) Date: Jul. 30, 2018

(87) PCT Pub. No.: WO2017/095439
PCT Pub. Date: Jun. 8, 2017

(65) Prior Publication Data
US 2019/0042893 A1  Feb. 7, 2019

(51) Int. Cl.
*G06F 16/22* (2019.01)
*G06K 9/62* (2006.01)
(Continued)

(52) U.S. Cl.
CPC .......... *G06K 9/6276* (2013.01); *G06F 16/22* (2019.01); *G06F 16/24568* (2019.01);
(Continued)

(58) Field of Classification Search
CPC .......... G06F 16/35; G06F 16/45; G06F 16/55; G06F 16/65; G06F 16/75; G06F 16/906;
(Continued)

(56) References Cited

U.S. PATENT DOCUMENTS 6,122,628 A    9/2000  Castelli et al.
7,024,404 B1*  4/2006  Gerasoulis .......... G06F 16/9535
(Continued)

FOREIGN PATENT DOCUMENTS

WO    WO-2011050412    5/2011

OTHER PUBLICATIONS

Benetis, R., Jensen, C.S., Karĉiauskas, G. et al. Nearest and reverse nearest neighbor queries for moving objects. (2006)The VLDB Journal 15, 229-249. (Year: 2006).*
(Continued)

*Primary Examiner* — Tamara T Kyle
*Assistant Examiner* — Lana Alagic
(74) *Attorney, Agent, or Firm* — Hewlett Packard Enterprise Patent Department (57) ABSTRACT

Incremental clustering of a data stream via an orthogonal transform based indexing is disclosed. One example is a system including an indexing module that retrieves a ranked neighbor list for a data object in a data stream, where the ranked list is based on an orthogonal transform based indexing of an incrementally updated nearest neighbor graph. A reverse neighbor determination module identifies a reverse neighbor list for the data object, the reverse neighbor list comprising previously received data objects that include the data object in their respective ranked lists. An evaluator determines a hub measure for the data object, where the hub measure is a size of the reverse neighbor list. A hub identification module determines, based on the hub measure, if the data object is a hub, where the hub is representative of a cluster of similar data objects.

18 Claims, 6 Drawing Sheets

(51) Int. Cl.
- *G06F 16/2457* (2019.01)
- *G06F 16/28* (2019.01)
- *G06F 16/2455* (2019.01)

(52) U.S. Cl.
CPC ...... *G06F 16/24578* (2019.01); *G06F 16/285* (2019.01); *G06K 9/6224* (2013.01); *G06K 9/6232* (2013.01)

(58) Field of Classification Search
CPC ............ G06F 16/285; G06F 16/24578; G06F 16/24568; G06K 9/6276; G06K 9/6224; G06K 9/6232
See application file for complete search history.

(56) References Cited

U.S. PATENT DOCUMENTS

| | | | |
|---|---|---|---|
| 7,797,265 B2* | 9/2010 | Brinker | G06F 16/353 706/45 |
| 2003/0187616 A1 | 10/2003 | Palmadesso et al. | |
| 2006/0047655 A1 | 3/2006 | Peter | |
| 2007/0101202 A1* | 5/2007 | Garbow | G06F 11/0709 714/47.2 |
| 2007/0244874 A1* | 10/2007 | Tawde | G06F 16/355 |
| 2010/0274785 A1 | 10/2010 | Procopiuc | |
| 2013/0230255 A1* | 9/2013 | Wang | G06F 16/583 382/201 |
| 2013/0325759 A1 | 12/2013 | Rachevsky et al. | |
| 2017/0154280 A1* | 6/2017 | Adir | G06F 16/285 |

OTHER PUBLICATIONS

Tomašev N., Radovanović M., Mladenić D., Ivanović M.(2011) The Role of Hubness in Clustering High-Dimensional Data. In: Huang J.Z., Cao L., Srivastava J. (eds) Advances in Knowledge Discovery and Data Mining. PAKDD 2011. Lecture Notes in Computer Science, vol. 6634. Springer, Berlin, Heidelberg (Year: 2011).*

Aggarwal et al., "A Framework for Projected Clustering of High Dimensional Data Streams", Proceedings of the 30th VLDB Conference, 2004, pp. 852-863.

Charu C. Aggarwal, "A Survey of Stream Clustering Algorithms", In Data Clustering: Algorithms and Applications, 2013, 47 pages.

Ester et al., "A Density-Based Algorithm for Discovering Clusters in Large Spatial Databases with Noise", KDD-96 Proceedings, 1996, pp. 226-231.

Guha et al., "Clustering Data Streams: Theory and Practice", IEEE Transactions on Knowledge and Data Engineering, vol. 15, No. 3, May/Jun. 2003, pp. 515-528.

Jain et al., "Algorithms for Clustering Data", Englewood Cliffs, NJ: Prentice-Hall, 1989, 330 pages.

Ntoutsi et al., "Density-based Projected Clustering over High Dimensional Data Streams", Institute for Informatics, SDM 2012, 12 pages.

Steinbach et al., "The Challenges of Clustering High Dimensional Data", New Vistas in Statistical Physics—Applications in Econophysics, Bioinformatics, and Pattern Recognition, 2003, pp. 1-33.

International Preliminary Report on Patentability received in PCT Application No. PCT/US2015/064013, dated Jun. 14, 2018, 6 pages.

Narmatha, N. et al.; "Optimal Clustering with Nearest Neighbor Relationships"; Oct. 2014; 7 pages.

PCT International Search Report issued in Appl. No. PCT/US2015/064013; dated Aug. 30, 2016; 3 pages.

Tomasev, N. et al., Hubness-based Clustering of High-dimensional Data, (Research Paper), May 19, 2014, 32 Pgs.

Tomasev, N. et al.; "the Role of Hubness in Clustering High-dimensional Data"; Jan. 21, 2011; 12 pages.

* cited by examiner

INCREMENTAL CLUSTERING OF A DATA STREAM VIA AN ORTHOGONAL TRANSFORM BASED INDEXING

BACKGROUND

Streaming data is generally analyzed for a wide variety of applications. For example, telecommunication companies, banks, the stock-market, astronomy labs, and news organizations receive high volumes of high-dimensional streaming data. Such data may be clustered by organizing the data objects into groups so that data objects in the same cluster are similar to each other, and dissimilar to data objects in different clusters.

DETAILED DESCRIPTION

Analysis of streaming data has gathered much attention in recent years. Telecommunication companies, banks, the stock-market, astronomy labs, news organizations and so forth, have high volumes of high dimensional data arriving continuously. An important and widely used data analysis tool is clustering, which generally involves organizing the data into groups or clusters so that objects in the same cluster are similar to each other, and dissimilar to objects in different clusters.

Although much attention has been given to clustering for streaming data, and multiple algorithms have been proposed, clustering for high dimensional streaming data has not been studied as widely. A variety of applications such as network monitoring, object recognition, stock price prediction, document topic extraction and organization and so forth, generate high volumes of high dimensional data that needs to be analyzed in near real-time. Existing techniques are generally ineffective in handling such high dimensional data, or fail to keep pace a constantly evolving nature of data streams. For example, some techniques involve an iterative clustering algorithm that results in a slow processing speed for data streams with a high flow rate. Similarly, existing techniques generally involve direct comparisons between pairs of data objects to determine clusters. Also, for example, existing techniques are generally based on knowing, a priori, a number of clusters that are to be determined.

Generally, existing clustering techniques may not be effective in high dimensional spaces because the increasing dimensionality on distance or similarity computations heavily affects the performance of the algorithms. Also, for example, they may fail to detect clusters that may be hidden in subspaces of the full dimensional space. Available techniques are also generally directed to clustering of static data, as opposed to streaming data. Some techniques on streaming data assume that the number of clusters remain a constant over time. As another example, some techniques on streaming data may utilize a density based projected clustering algorithm for high dimensional streams. This method incorporates subspace analysis in the clustering process. Furthermore, since it is a density-based technique, it is designed to handle different cluster shapes. However, this clustering approach does not operate on the full high dimensional space, but rather on a projected dimensional space.

Accordingly, applications that involve the use and analysis of high volumes of high dimensional data may benefit from an efficient online and accurate clustering of data streams, where the clustering does not involve direct comparisons of data objects, does not require a predetermined number of clusters, and is able to perform the analysis in the high dimensional space. As described herein, an orthogonal transform based indexing to retrieve the nearest neighbors of data objects facilitates efficient clustering for high dimensional data streams. Also, for example, an exact number of clusters need not be predetermined. Instead, the techniques described herein may take as input a maximum number of clusters, and automatically determine how many clusters are to be generated.

Graph techniques are often applied to represent and efficiently analyze neighbors for data objects. One such graph representation is a k-nearest neighbor ("kNN") graph. A kNN graph comprises of nodes that are data objects, and edges that connect a data object to k proximal data objects, where proximity between data objects may be based on an appropriate similarity. The proximal data objects are generally referred to as neighbors, and a collection of neighbors for a data object is referred to as a neighbor list for the data object.

A kNN graph may help represent and analyze large volumes of data by revealing nearest matches to any data object. kNN graphs are extensively used in areas such as machine learning, data mining, computer vision and image processing. Applications that utilize kNN graphs include but are not limited to similarity search, collaborative filtering, data compression, retrieval, clustering, and classification. For example, large Enterprise data warehousing applications may use collaborative filtering to sort and/or search content relevant to a particular topic thread. As another example, an online retailer may use a similarity search to make product recommendations based on a particular customer's recent purchases. Also, for example, a security firm may use nearest neighbor matches to identify known persons from live video feeds.

Nearest neighbor graph constructions generally use various methods such as recursive Lanczos bisection, Morton ordering, or local search. Generally, such approaches construct the nearest neighbor graph by comparing data objects directly. Approximate algorithms such as locality sensitive hashing may reduce the comparison space, but data objects in the smaller comparison space are compared directly to each other. This is generally not effective for high velocity, high volume data streams. Some hash-based techniques may be used to update the kNN graph, but these hashing techniques often display anomalies due to a distance metric distortion.

As described herein, clustering may be based on an orthogonal transform based indexing that may be used to efficiently compute the nearest neighbors of a data object in a kNN graph. Such a system is well-adapted for streaming data scenarios and scales well with high-dimensional data as well. As described in various examples herein, incremental clustering of a data stream via an orthogonal transform based indexing is disclosed. One example is a system including an indexing module that retrieves, via a processor, a ranked neighbor list for a data object in a data stream, where the ranked list is based on an orthogonal transform based indexing of an incrementally updated nearest neighbor graph. A reverse neighbor determination module identifies, via the processor, a reverse neighbor list for the data object, where the reverse neighbor list comprises previously received data objects that include the data object in their respective ranked lists. An evaluator determines a hub measure for the data object, where the hub measure is a size of the reverse neighbor list for the data object. A hub identification module determines, based on the hub measure, if the data object is a hub, where the hub is representative of a cluster of similar data objects.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
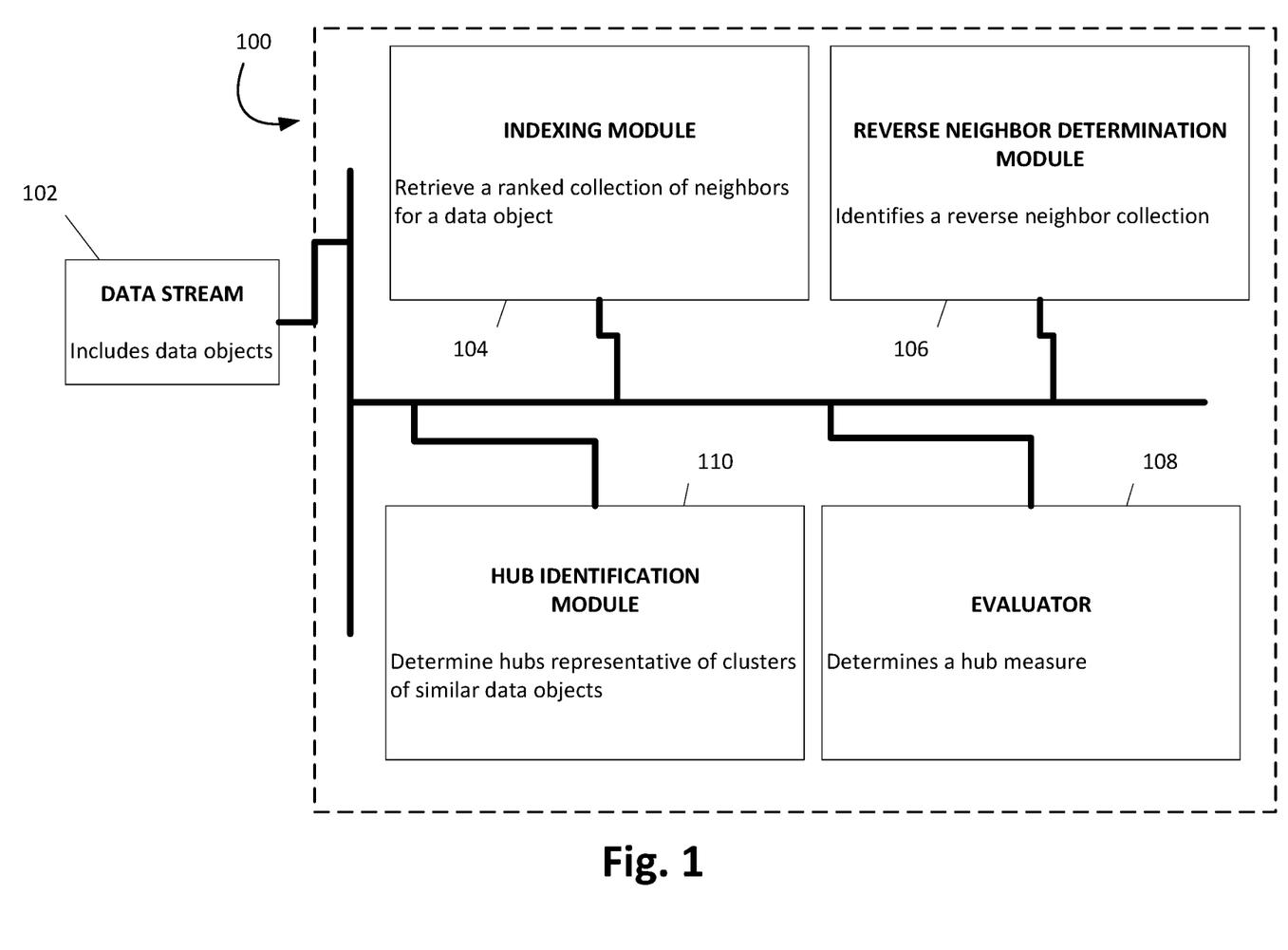
FIG. 1 is a functional block diagram illustrating one example of a system for incremental clustering of a data stream via an orthogonal transform based indexing.

FIG. 1 is a functional block diagram illustrating one example of a system 100 for incremental clustering of a data stream via an orthogonal transform based indexing. System 100 includes an indexing module 104, a reverse neighbor determination module 106, an evaluator 108, and a hub identification module 110. The indexing module 104 may retrieve, via a processor, a ranked neighbor list for a data object in a data stream, where the ranked list is based on an orthogonal transform based indexing of an incrementally updated nearest neighbor graph. In some examples, the data stream may be an incoming data stream.

A nearest neighbor graph (e.g., a kNN graph) comprises of nodes that are data objects, and edges that connect a data object to k proximal data objects, where proximity between data objects may be based on an appropriate similarity. The proximal data objects are generally referred to as neighbors, and a collection of neighbors for a data object is referred to as a neighbor list for the data object. The term "retrieve" as used herein, may generally refer to accessing a database, via the processor, where the database may store a kNN graph, neighbor lists for data objects, a list of distributions, data indicative of similarities between data objects, and so forth.

In some examples, the term "retrieve" may indicate that the indexing module 104 is communicatively linked to another system that is capable of incrementally updating a kNN graph, updating neighbor lists, and so forth. In some examples, the indexing module 104 may retrieve neighbor lists that may be ranked or ordered based on some criterion. For example, the list may be ranked based on proximity to a first data object. Such a neighbor list will be referred to herein as a ranked neighbor list.

In some examples, the neighbor lists are based on an orthogonal transform based indexing of an incrementally updated neighbor graph. For example, an orthogonal transform may be applied to a data object in the data stream 102, and the data object may be associated with a subset of U ordered hash positions. A flow rate f for the data stream 102, say S, may be measured as data objects received per second. In other words, every second, f number of data objects arrive via incoming data stream S. In some examples, hash transforms may generally be associated at a rate similar to the flow rate. As described in some examples, a neighbor graph, such as a kNN graph for stream S, is a time-varying directed graph where each vertex (representing an object) is connected to similar vertices. In some examples, each vertex may be connected to its top-k most similar vertices via a directed edge.

The term "incremental update", as used herein, generally refers to an iterative update of at least one of the neighbor graph, the neighbor lists, index, hubs, clusters, and so forth, as data objects arrive in the data stream 102. As described herein, such an incremental update may be based on a local determination of neighborhood relations. For example, although an incoming data object may be a nearest neighbor for a large number of previously received data objects, an appropriate sub-list of these received data objects may be selected for an incremental update, the neighbor graph may be updated to reflect a change in neighborhoods for the selected data objects. In some examples, the neighbor graph may be incrementally updated by including a new data object as a neighbor for a selected sub-plurality of data objects in the ranked list, where the selection is based on neighborhood comparisons for the data object and data objects in the ranked list.

As described herein, a data object (e.g. a numerical N-dimensional vector) in the data stream 102 may be associated with a subset of U ordered hash positions. In some examples, the subset may have a fixed size H. A hash position generally refers to a hash symbol located at an integer from the set $\{1, 2, \ldots, U\}$, where U is generally much larger than N, and N is much larger than H. Hashes may be generally used to provide a representation of the data object. Such a hash representation may be utilized for efficient comparisons between pairs of data objects. Generally, U may be a power of 2. For example, one instance may be H=100, N=6000, and U=$2^{18}$. The H hashes may be based on H largest coefficients provided by the orthogonal transform. Accordingly, an N-dimensional object may be projected onto a lower H-dimensional object.

In some examples, the data stream 102 may include a plurality of vectors with numerical, real-valued components. System 100 may be provided with values for H and U. The integer H may be experimentally determined based on the type and number of data objects in the data stream 102. Generally, U is a very large integer relative to H. In one example, U is a power of 2.

In some examples, the orthogonal transform may be a Walsh-Hadamard transform ("WHT"). A WHT is an orthogonal, non-sinusoidal transform that takes a signal as input and outputs a set of basis functions. The output functions are known as Walsh functions. A Walsh function takes two values: +1 and −1. Generally, performing an orthogonal transform on the data stream 102 provides a set of coefficients associated with the data stream 102. For example, after application of the Walsh-Hadamard transform to the data object, the indexing module 104 may retrieve a list of coefficients $c_1, c_2, \ldots, c_k$. Alternative forms of orthogonal transforms may be utilized as well. For example, a cosine transform may be utilized.

In some examples, the H largest coefficients, $c_{n_1}, c_{n_2}, \ldots, c_{n_H}$ may be selected as the subset of hashes associated with the data object, say A. Table 1 illustrates an example association of data objects A, B, and C, with sets of hashes:

TABLE 1

| Data Term | Set of Hashes |
|---|---|
| A | {1, 5, 9, 13, 16} |
| B | {2, 3, 4, 7, 13} |
| C | {1, 5, 7, 8, 11} |

In some examples, the indexing may be based on an orthogonal transform based indexing of the incrementally updated nearest neighbor graph. In some examples, the indexing module 104 may retrieve, via the processor, an index of U ordered key positions, where each key position is indicative of received data objects of the data stream 102 that have a hash position at the key position. Table 2 illustrates an example index with $U=2^4$ key positions {1, 2, . . . , 16} with data objects A, B, and C, based on sets of H=5 hashes in Table 1.

TABLE 2

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| A |   |   |   | A |   |   |   | A |    |    |    | A  |    | A  |    |
|   | B | B | B |   |   | B |   |   |    |    |    | B  |    |    |    |
| C |   |   |   | C |   | C | C |   |    |    | C  |    |    |    |    |

As illustrated, ordered key positions 1 and 5 are indicative of received data objects A and C since these data objects have hashes at the hash positions 1 and 5, as illustrated in Table 1. Likewise, ordered key position 13 is indicative of received data objects A and B since these data objects have hashes at the hash position 13, as illustrated in Table 1.

In some examples, the indexing module 104 may update the index by inserting, via the processor, a unique identifier associated with the data object into each key position of the index that corresponds to a hash position for the data object. For example, data objects B and C may have been received by system 100 prior to receiving the data object A. Accordingly, the indexing module 104 may have updated the index by inserting unique identifiers associated with the data object A. For example, the data object A may have hashes at hash positions 1, 5, 9, 13, and 16, as illustrated in Table 1. Accordingly, the indexing module 104 may update the index by inserting unique identifiers associated with the data object A at key positions 1, 5, 9, 13, and 16, as illustrated in Table 2.

In some examples, the indexing module 104 may maintain a database of ranked collections associated with data objects in the data stream 102. In some examples, the ranked collection of neighbors for the data object may comprise top k nearest neighbors (e.g., based on the similarity measure) determined based on a count of overlapping hash positions in the updated index. In some examples, the ranked collection of neighbors for the data object may comprise a predetermined number of neighbors. In some examples, the ranked collection of neighbors for the data object may comprise neighbors that are approximately close to the data object. For example, neighbors may be determined to be ones that have similarity measures in the range 3 to 5. An example illustration of the ranked collection is described herein with respect to a next data object.

In some examples, a next data object may be received after the data object, and a new ranked collection of neighbors may be determined for the next data object based on the updated index. For example, the next data object Q may be received after the data object A, which, in turn, may be received after the received data objects B and C. The next data object Q may be associated with a subset of U ordered hash positions, say {1, 5, 7, 9, 13}. Table 4 illustrates an example updated index with $U=2^4$ key positions {1, 2, . . . , 16} with data objects A, B, C, and Q:

TABLE 4

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| A |   |   |   | A |   |   |   | A |    |    |    | A  |    | A  |    |
|   | B | B | B |   |   | B |   |   |    |    |    | B  |    |    |    |
| C |   |   |   | C |   | C | C |   |    |    |    | C  |    |    |    |
| Q |   |   |   | Q |   | Q |   | Q |    |    |    | Q  |    |    |    |

Table 5 illustrates an example list of terms associated with the next data object Q illustrated in Table 4, and the corresponding similarity measures.

TABLE 5

| 1 | 5 | 6 | 7 | 9 | 10 | 13 | Similarity Measures |
|---|---|---|---|---|----|----|---------------------|
| A | A |   |   | A |    | A  | S(Q, A) = 4 |
|   |   |   | B |   |    | B  | S(Q, B) = 2 |
| C | C |   | C |   |    |    | S(Q, C) = 3 |

As illustrated, the set of hashes associated with the next data object Q may be compared with the indexed data objects illustrated in Table 2. Based on such a comparison, index position 1 is indicative of a hash position associated with Q and index position 1 is also indicative of hash positions associated with data objects A and C. Also, for example, index position 5 is indicative of a hash position associated with Q, and index position 5 is also indicative of hash positions associated with data objects A and C. As another example, index position 13 is indicative of a hash position associated with Q, and index position 13 is also indicative of hash positions associated with data objects A and B. A frequency of occurrence for A may be determined to be 4. This is also the similarity measure for the pair Q and A. A frequency of occurrence for B may be determined to be 2. This is also the similarity measure for the pair Q and B. A frequency of occurrence for C may be determined to be 3. This is also the similarity measure for the pair Q and C.

As described herein, a new ranked collection of neighbors for the next data object may be determined based on the updated index (e.g., as illustrated in Table 4). For example, based on a similarity measure of the next data object with each data object, a new ranked collection of neighbors for the next data object may be determined. Based on the example illustrated in Table 5, the new ranked collection of neighbors for the next data object Q may be determined to be A, C, and B.

A neighbor graph may be incrementally updated, via the processor, by including the data object as a neighbor for a selected sub-plurality of data objects in the ranked collection, where the selection is based on neighborhood comparisons for the data object and data objects in the ranked collection. The term "incremental update", as used herein, generally refers to an iterative update of the neighbor graph as data objects arrive. As described herein, such an incremental update may be based on a local determination of neighborhood relations. For example, although an incoming data object may be a nearest neighbor for a large number of previously received data objects, an appropriate sub-collection of these received data objects may be selected for an incremental update, the neighbor graph may be updated to reflect a change in neighborhoods for the selected data objects.

System 100 includes the reverse neighbor determination module 106 to identify, via the processor, a reverse neighbor list for the data object, where the reverse neighbor list comprises previously received data objects that include the data object in their respective ranked lists. For each data object $\alpha$, the reverse neighbor determination module 106 maintains an associated reverse neighbor list $rNN_\alpha$ which is a list of data objects that contain $\alpha$ in their nearest neighbor lists.

A neighbor graph, such as a kNN graph for stream S, is a time-varying directed graph where each vertex (representing an object) is connected to similar vertices. In some examples, each vertex may be connected to its top-k most similar vertices via a directed edge. For streaming data scenarios with a high flow rate, an approximate kNN graph may be determined and updated after every data object arrival/insertion. For a flow rate of f, this may generally involve f updates per second. In some examples, an approximate nearest neighbor list of k nearest neighbors for the data object may be maintained. Such a list may be incrementally updated with the arrival of each new data object in the data stream 102. Accordingly, the hub measure may be incrementally updated based on the approximate nearest neighbor list. In some examples, the reverse neighbor determination module 106 updates, via the processor, reverse neighbor lists for the received data objects by including the data object in reverse neighbor lists for the top k nearest neighbors of the data object. For example, when the data object $\alpha$ is received, the reverse neighbor determination module 106 may identify the top-k nearest neighbors, say $x_1, x_2, \ldots, x_k$, for $\alpha$, and add $\alpha$ to their respective reverse neighbor lists, $rNN_{x_1}$, $rNN_{x_2}, \ldots, rNN_{x_k}$.

In some examples, the reverse neighbor determination module 106 updates, via the processor, reverse neighbor lists for the received data objects by identifying data objects that include the data object in their respective ranked neighbor lists, and including the identified data objects in the reverse neighbor lists for the data objects. For example, the reverse neighbor determination module 106 identifies the data objects $\gamma_1, \gamma_2, \ldots, \gamma_m$, for which the respective nearest neighbor lists were updated to include the incoming data object $\alpha$. Accordingly, the reverse neighbor determination module 106 updates the nearest neighbor list $rNN_\alpha$ for $\alpha$ by adding the identified data objects $\gamma_1, \gamma_2, \ldots, \gamma_m$. As a nearest neighbor list is updated to include the incoming data object $\alpha$, there is a corresponding data object that is removed from the nearest neighbor list. Accordingly, in the reverse neighbor determination module 106 identifies such data objects that are removed from the updated nearest neighbor lists for $\gamma_1, \gamma_2, \ldots, \gamma_m$, and removes such data objects from the reverse neighbor lists, $rNN_{\gamma_1}$, $rNN_{\gamma_2}, \ldots, rNN_{\gamma_m}$, for $\gamma_1, \gamma_2, \ldots, \gamma_m$, respectively.

System 100 includes the evaluator 108 to determine a hub measure for the data object, where the hub measure is a size of the reverse neighbor list for the data object. More formally, the hub measure for the data object, represented as $h_\alpha$, may be determined as:

$$h_\alpha = \text{length}(rNN_\alpha), \quad \text{(Eqn. 1)}$$

System 100 includes the hub identification module 110 to determine, based on the hub measure, if the data object is a hub, where the hub is representative of a cluster of similar data objects. Generally, a hub is a data point that may appear frequently in the nearest neighbor lists of other data points. Hubs are often able to offer unique insights on the data since they reveal regions where data may be concentrated, and thereby being good candidates for cluster representatives. As described herein, an incrementally updated kNN graph may be utilized to detect top H hubs that appear most frequently in the nearest neighbor lists of other data points. For each incoming data object, a most similar hub may be identified, and the incoming data object may be assigned to the identified hub. Such an assignment may be efficiently performed via an orthogonal transform based indexing as described herein.

As described herein, a number of hubs may be automatically determined. For example, a user may input, via a computing device, a maximum number of clusters $H_{max}$. The hub identification module 110 selects the top H data objects with the highest hub measures. In some examples, the hub identification module 110 determines that the data object is a hub based on a determination that the data object is not similar to an existing hub. Similarity of the hubs is an important factor in their selection, since if hubs are similar they might represent the same cluster. Also, for example, if the hub identification module 110 selects similar hubs with high hub measures, then the hub identification module 110 may fail to select hubs with lower hub measures that may be representative of distinct clusters with fewer data objects in them.

In some examples, the determination that the data object is not similar to the existing hub may be based on a size of an overlap of the reverse neighbor list for the data object with a reverse neighbor list for the existing hub. Similarity for a pair of hubs may be therefore be defined based on overlaps of their respective reverse neighbor lists. More formally, a first hub $h_1$ is similar to a second hub $h_2$ if $$rNN_{h_1} \cap rNN_{h_2} > T, \quad \text{(Eqn. 2)}$$

where T is an overlap threshold. Accordingly, to identify the top H hubs, the hub identification module 110 identifies non-overlapping hubs, and selects from among these, the hubs that have highest hub measures. In some examples, the hub identification module 110 may not detect data objects with overlap less than T, and may therefore identify fewer clusters than the maximum allowed number, $H_{max}$. Accordingly, the hub identification module 110 may automatically determine a number of hubs (or clusters) in the range $[1, H_{max}]$.

In some examples, the hub identification module 110 may determine that the incoming data object is not a hub, and may associate the incoming data object with an existing cluster. For example, similarity measures between the incoming data object and the existing hubs may be determined, and compared, to identify an existing hub that is most similar to the incoming data object.

In some examples, based upon a determination that the data object is a hub, the hub identification module 110 modifies existing clusters. In some examples, the hub identification module 110 modifies the existing clusters by generating a new cluster with the data object as the hub, where the new cluster is generated by including all data objects in the ranked neighbor list for the data object, identifying a k-th neighbor in the ranked neighbor list for the data object, and including, in the new cluster, additional data objects of the received data objects that are closer to the data object than the k-th neighbor.

For example, the hub identification module 110 may re-evaluate hubs as each incoming data object $\alpha$ is received. In some examples, an existing hub may be replaced with the incoming data object $\alpha$. For example, the incoming data object $\alpha$ may not be similar to the existing hub, and may have a higher hub measure than the existing hub. Accordingly, data objects, $\delta_1, \delta_2, \ldots, \delta_l$, in the existing cluster associated with the existing hub will be reassigned. A new cluster $C_\alpha$, with $\alpha$ as a new hub, may be determined by associating each data object in the nearest neighbor list for $\alpha$ to the new cluster $C_\alpha$ associated with the new hub $\alpha$. Next, the hub identification module 110 may identify the k-th neighbor in the ranked neighbor list for α and identify a first collection of data objects among $\delta_1, \delta_2, \ldots, \delta_j$ that are closer (more similar) to α than its k-th neighbor. The hub identification module 110 may associate the first collection of data objects with the new cluster $C_\alpha$. Finally, there may be a second collection of data objects among $\delta_1, \delta_2, \ldots \delta_j$ that are not closer (less similar) to α than its k-th neighbor. For each data object in the second collection data objects, the hub identification module 110 may determine a similarity between the data object and each existing hub, to identify a most similar hub for the data object.

In some examples, the hub identification module 110 may provide, via the processor to a computing device, an incrementally updated computer generated visual rendition of hubs and respective clusters for the data stream 102. For example, as each data object is received by system 100 and processed as described herein, the hub identification module 110 may retrieve the updated ranked collections, and display the data objects in the updated hubs and clusters.

Figure 2:
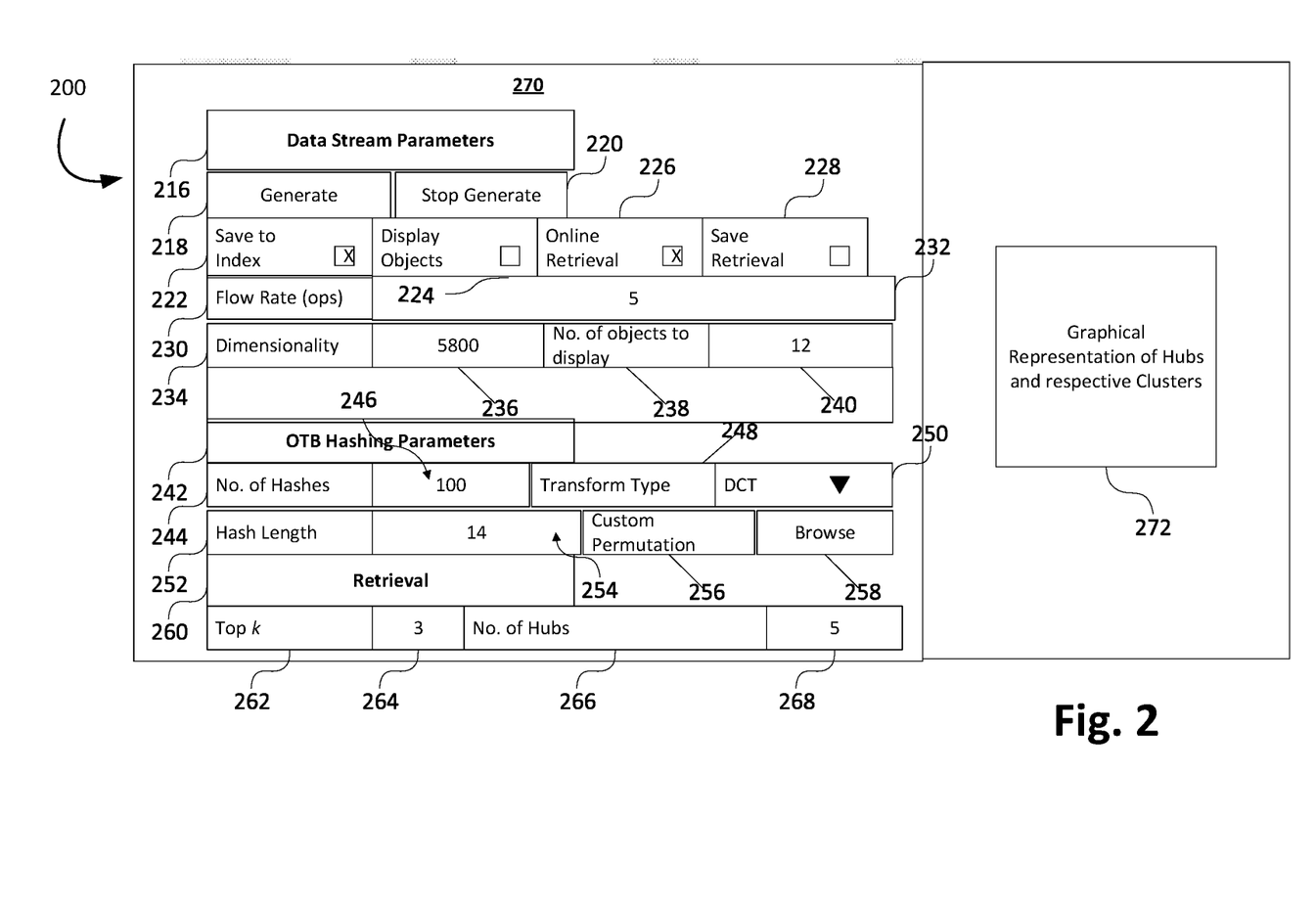
FIG. 2 is a schematic representation of an example of an incrementally updated computer generated visual rendition of hubs and respective clusters for the data stream.

FIG. 2 is a schematic representation of an example of an incrementally updated computer generated visual rendition of hubs and respective clusters for the data stream. In some examples, the visual rendition 200 may comprise a dashboard 270 and a graphical representation of hubs and/or respective clusters 272. In some examples, the dashboard 270 may be a web-based dashboard with interactive user interfaces. In some examples, the graphical representation 272 may be hubs represented in graphical form with nearest neighbors in their respective clusters. In some examples, the graphical representation 272 may be clusters in tabular form indicative of hubs and a list of data objects in their respective clusters.

In some examples, the dashboard 270 may include user interfaces to select data stream parameters 216, input orthogonal transform based ("OTB") hashing parameters 242, and input retrieval parameters 260.

In some examples, the user interfaces to select the data stream parameters 216 may include a first option 218 to generate the graphical representation 272, and a second option 220 to stop generating the graphical representation 272. Additional selectable options may be provided, for example, a selectable option to "Save to Index" 222 that updates the index, a selectable option to "Display Objects" 224 that displays the data objects, a selectable option for "Online Retrieval" 226 that retrieves data objects, and a selectable option to "Save Retrieval" 228 that saves the retrieved data objects.

Also, for example, user interfaces may be provided to input parameters for the data stream. For example, a third user interface 232 may be provided to input a flow rate 230 for the data stream. For example, a flow rate of "5" may be input, and the data stream may be received at the rate of 5 objects per second ("ops"). A fourth user interface 236 may be provided to input a value for dimensionality 234 of the data objects. For example, a value of 5800 may be input in the fourth user interface 236 indicating that the data objects may comprise 5800-dimensional vectors. A fifth user interface 240 may be provided to input a number of data objects 238 to be displayed. For example, a value of 12 may be input in the fifth user interface 240, and accordingly 12 data objects may be displayed in the graphical representation 272.

In some examples, the user interfaces to input the OTB hashing parameters 242 may include a sixth user interface 246 to input a number of hashes 244. For example, a value of 100 may be input in the sixth user interface 246, and accordingly 100 hashes may be utilized for the hash based transformations described herein. Also, for example, a drop-down menu 250 may be provided to allow selection of a transform type 248. The transform type 248 may include, for example, a discrete cosine transform ("DCT"), a Walsh-Hadamard transform ("WHT"), and so forth. A seventh user interface 254 may be provided to input a hash length 252. For example, a value of 14 may be input in the seventh user interface 254, and accordingly the hash length may be set to 14 for the hash based transformations described herein. Also, for example, a menu option 258 may be provided to select a custom permutation 256.

In some examples, the user interfaces to input the retrieval parameters 260 may include an eighth user interface 264 to input a number for the top k neighbors to be retrieved. For example, a value of 3 may be input in the eighth user interface 264, and accordingly the top 3 nearest neighbors (based on similarity measures) may be updated for each data object. In some examples, a ninth user interface 268 may be provided to input a value for a number of hubs 266 (e.g., maximum number of hubs). For example, a value of 5 may be input in the ninth user interface 268, and accordingly the incremental clustering may be performed based on a maximum number of 5 hubs. Also, for example, the graphical representation 272 may be rendered for the generated hubs and clusters based on the maximum number of allowable hubs.

Referring again to FIG. 1, the components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the indexing module 104 is a combination of hardware and programming to retrieve, via the processor, a ranked neighbor list for a data object in a data stream 102, where the ranked list is based on an orthogonal transform based indexing of an incrementally updated nearest neighbor graph. For example, the indexing module 104 may include software programming to automatically update the index by inserting, via the processor, unique identifiers associated with each data object into each key positions of the index that correspond to hash positions for the data object. Also, for example, the indexing module 104 may include hardware to physically store, for example, the ranked neighbor lists. Also, for example, the indexing module 104 may include a combination of hardware and software programming to dynamically interact with the other components of system 100.

In like manner, the reverse neighbor determination module 106 is a combination of hardware and programming. For example, the reverse neighbor determination module 106 may include software programming instructions to identify, via the processor, a reverse neighbor list for the data object, where the reverse neighbor list comprises previously received data objects that include the data object in their respective ranked lists. Also, for example, the reverse neighbor determination module 106 may include hardware to physically store, for example, the reverse neighbor lists. The reverse neighbor determination module 106 may include a combination of hardware and software programming to dynamically interact with the other components of system 100.

Also, for example, the evaluator 108 is a combination of hardware and programming. For example, the evaluator 108 may include software programming instructions to determine a hub measure for the data object, where the hub measure is a size of the reverse neighbor list for the data object. The evaluator 108 may include a combination of hardware and software programming to dynamically interact with the other components of system 100.

As another example, the hub identification module 110 may include software programming instructions to determine, based on the hub measure, if the data object is a hub, wherein the hub is representative of a cluster of similar data objects. In some examples, the hub identification module 110 may include software programming instructions to generate an incrementally updated computer generated visual rendition of hubs and respective clusters for the data stream. The hub identification module 110 may include a combination of hardware and software programming to dynamically interact with the other components of system 100.

Generally, as described herein, the components of system 100 may include software programming and physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 3:
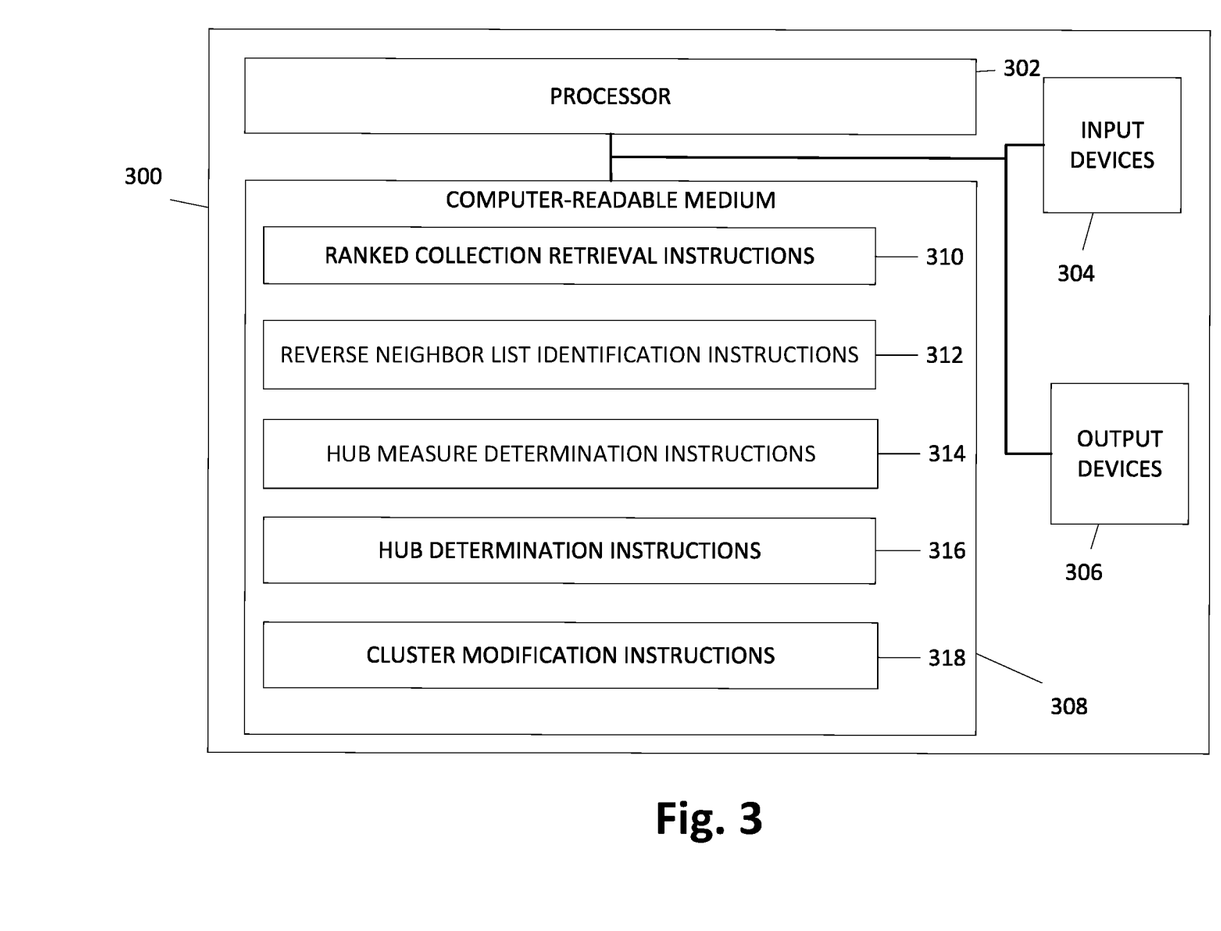
FIG. 3 is a block diagram illustrating one example of a computer readable medium for incremental clustering of a data stream via an orthogonal transform based indexing.

FIG. 3 is a block diagram illustrating one example of a computer readable medium for incremental clustering of a data stream via an orthogonal transform based indexing. Processing system 300 includes a processor 302, a computer readable medium 308, input devices 304, and output devices 306. Processor 302, computer readable medium 308, input devices 304, and output devices 306 are coupled to each other through a communication link (e.g., a bus).

Processor 302 executes instructions included in the computer readable medium 308. Computer readable medium 308 includes ranked collection retrieval instructions 310 to retrieve, via a processor, a ranked neighbor list for a data object in a data stream, where the ranked list is based on an orthogonal transform based indexing of an incrementally updated nearest neighbor graph.

Computer readable medium 308 includes reverse neighbor list identification instructions 312 to identify, via the processor, a reverse neighbor list for the data object, wherein the reverse neighbor list comprises previously received data objects that include the data object in their respective ranked lists.

Computer readable medium 308 includes hub measure determination instructions 314 to determine, via the processor, a hub measure for the data object, wherein the hub measure is a size of the reverse neighbor list for the data object.

Computer readable medium 308 includes hub determination instructions 316 to determine, based on the hub measure, if the data object is a hub, where the hub is representative of a cluster of similar data objects.

Computer readable medium 308 includes cluster modification instructions 318 to modify existing clusters based on the determination if the data object is or is not a hub.

In some examples, computer readable medium 308 includes instructions to determine that the data object is a hub based on a determination that the data object is not similar to an existing hub.

Input devices 304 include a keyboard, mouse, data ports, and/or other suitable devices for inputting information into processing system 300. In some examples, input devices 304, such as a computing device, are used to receive a data stream. In some examples, input devices 304, such as a computing device, are used to receive a maximum number of clusters $H_{max}$ and/or an overlap threshold, T. Output devices 306 include a monitor, speakers, data ports, and/or other suitable devices for outputting information from processing system 300. In some examples, output devices 306 are used to provide the incrementally updated computer generated visual rendition of hubs and respective clusters for the data stream.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 308 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 300 are identified and refer to a combination of hardware and programming configured to perform a designated visualization function. As illustrated in FIG. 3, the programming may be processor executable instructions stored on tangible computer readable medium 308, and the hardware may include processor 302 for executing those instructions. Thus, computer readable medium 308 may store program instructions that, when executed by processor 302, implement the various components of the processing system 300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 308 may be any of a number of memory components capable of storing instructions that can be executed by Processor 302. Computer readable medium 308 may be non-transitory in the sense that it does not encompass a transitory signal but instead is made up of one or more memory components configured to store the relevant instructions. Computer readable medium 308 may be implemented in a single device or distributed across devices. Likewise, processor 302 represents any number of processors capable of executing instructions stored by computer readable medium 308. Processor 302 may be integrated in a single device or distributed across devices. Further, computer readable medium 308 may be fully or partially integrated in the same device as processor 302 (as illustrated), or it may be separate but accessible to that device and processor 302. In some examples, computer readable medium 308 may be a machine-readable storage medium.

Figure 4:
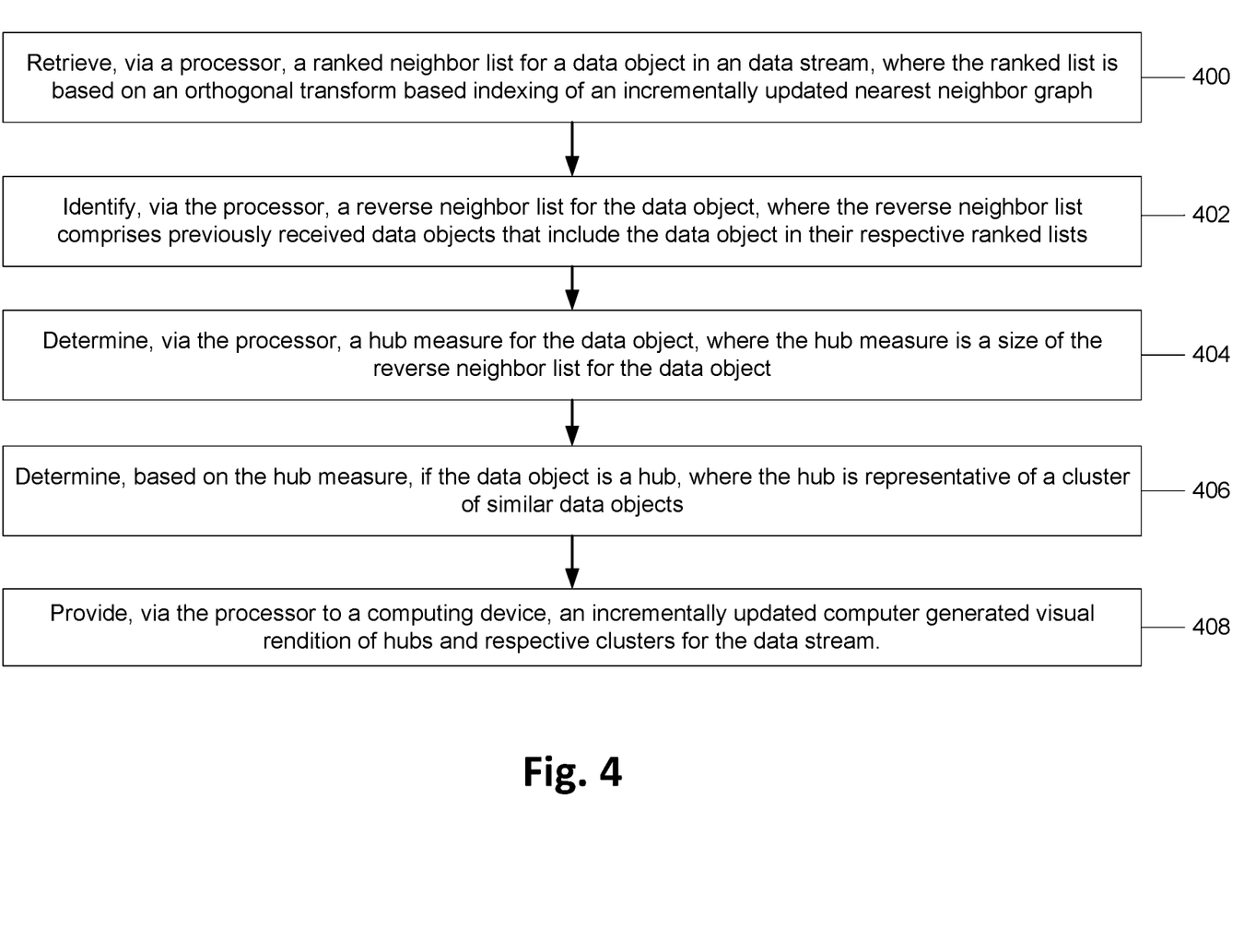
FIG. 4 is a flow diagram illustrating one example of a method for incremental clustering of a data stream via an orthogonal transform based indexing.

FIG. 4 is a flow diagram illustrating one example of a method for incremental clustering of a data stream via an orthogonal transform based indexing. In some examples, such an example method may be implemented by a system such as, for example, system 100 of FIG. 1.

At 400, a ranked neighbor list for a data object in a data stream is retrieved via a processor, where the ranked list is based on an orthogonal transform based indexing of an incrementally updated nearest neighbor graph.

At 402, a reverse neighbor list for the data object is identified via the processor, where the reverse neighbor list comprises previously received data objects that include the data object in their respective ranked lists.

At 404, a hub measure for the data object is determined via the processor, where the hub measure is a size of the reverse neighbor list for the data object.

At 406, based on the hub measure, it is determined if the data object is a hub, where the hub is representative of a cluster of similar data objects.

At 408, an incrementally updated computer generated visual rendition of hubs and respective clusters for the data stream is provided via the processor to a computing device.

Figure 5:
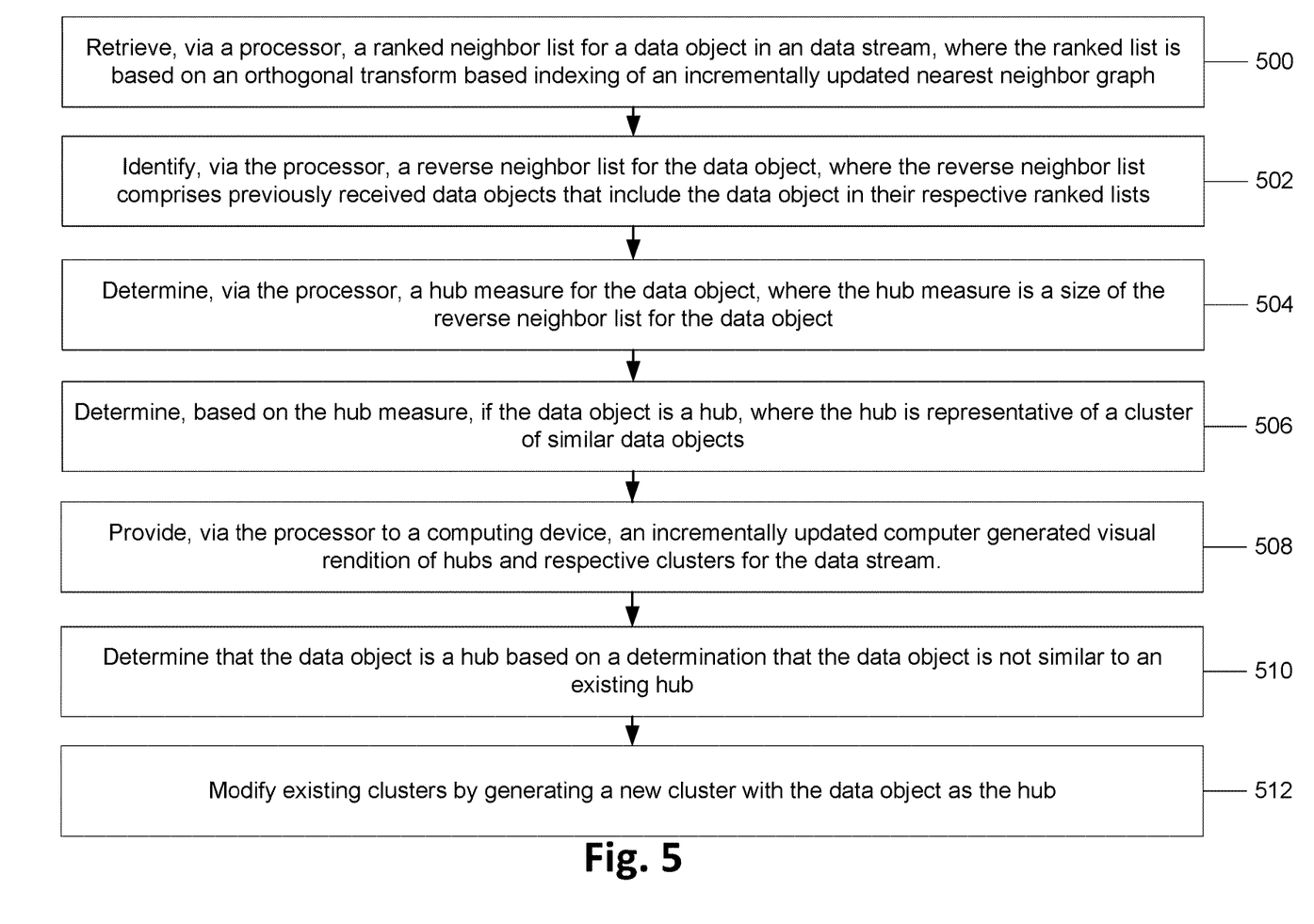
FIG. 5 is a flow diagram illustrating one example of a method for modifying existing clusters in an incremental clustering of a data stream via an orthogonal transform based indexing.

FIG. 5 is a flow diagram illustrating one example of a method for providing an incremental clustering of a data stream via an orthogonal transform based indexing. In some examples, such an example method may be implemented by a system such as, for example, system 100 of FIG. 1.

At 500, a ranked neighbor list for a data object in a data stream is retrieved via a processor, where the ranked list is based on an orthogonal transform based indexing of an incrementally updated nearest neighbor graph.

At 502, a reverse neighbor list for the data object is identified via the processor, where the reverse neighbor list comprises previously received data objects that include the data object in their respective ranked lists.

At 504, a hub measure for the data object is determined via the processor, where the hub measure is a size of the reverse neighbor list for the data object.

At 506, based on the hub measure, it is determined if the data object is a hub, where the hub is representative of a cluster of similar data objects.

At 508, an incrementally updated computer generated visual rendition of hubs and respective clusters for the data stream is provided via the processor to a computing device.

At 510, it may be determined that the data object is a hub based on a determination that the data object is not similar to an existing hub.

At 512, existing clusters may be modified by generating a new cluster with the data object as the hub, the new cluster being generated by including all data objects in the ranked neighbor list for the data object, identifying a k-th neighbor in the ranked neighbor list for the data object, and including, in the new cluster, additional data objects of the received data objects that are closer to the data object than the k-th neighbor.

Figure 6:
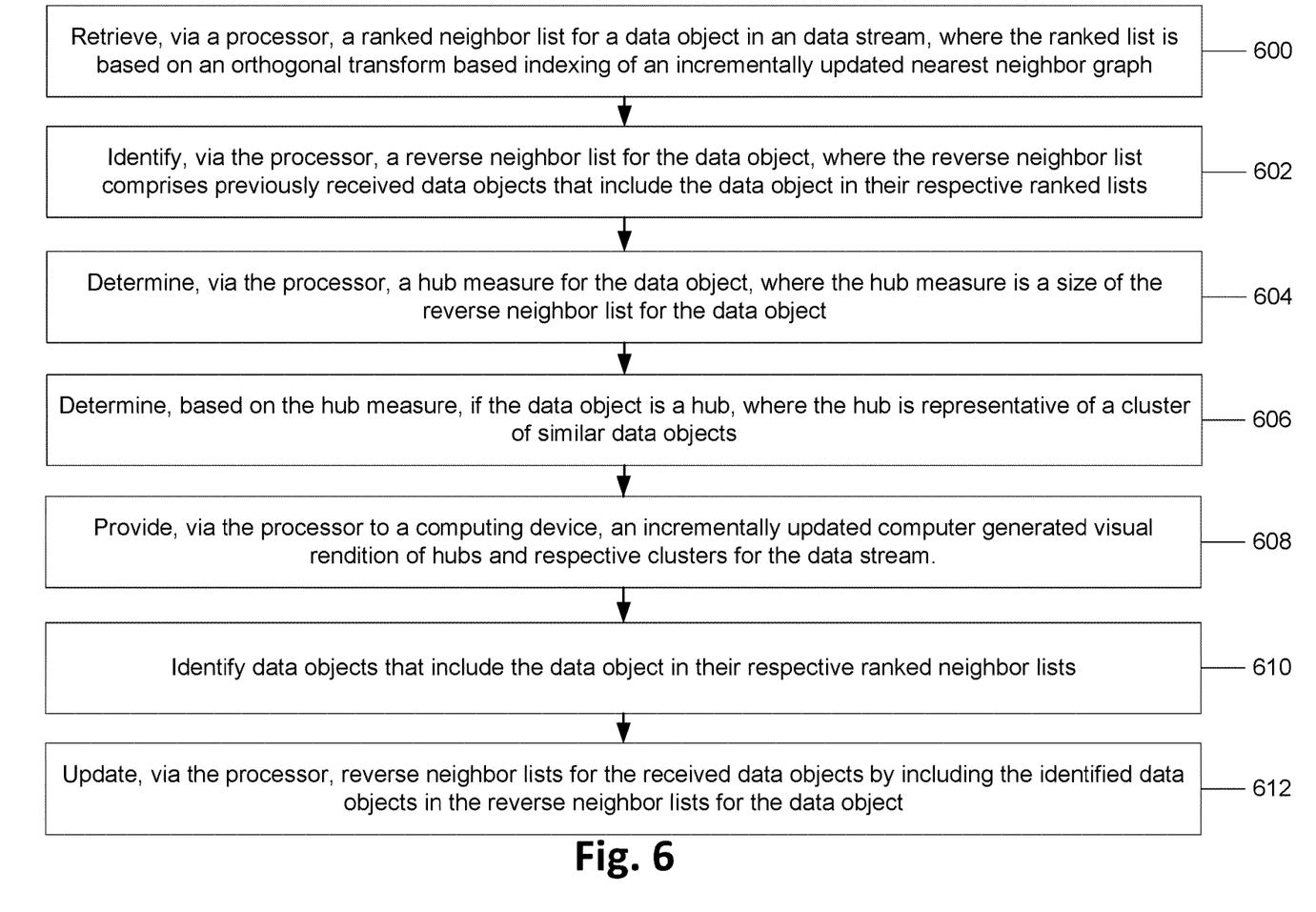
FIG. 6 is a flow diagram illustrating one example of a method for updating reverse neighbor lists in an incremental clustering of a data stream via an orthogonal transform based indexing.

FIG. 6 is a flow diagram illustrating one example of a method for maintaining a database of ranked collections for an incremental clustering of a data stream via an orthogonal transform based indexing. In some examples, such an example method may be implemented by a system such as, for example, system 100 of FIG. 1.

At 600, a ranked neighbor list for a data object in a data stream is retrieved via a processor, where the ranked list is based on an orthogonal transform based indexing of an incrementally updated nearest neighbor graph.

At 602, a reverse neighbor list for the data object is identified via the processor, where the reverse neighbor list comprises previously received data objects that include the data object in their respective ranked lists.

At 604, a hub measure for the data object is determined via the processor, where the hub measure is a size of the reverse neighbor list for the data object.

At 606, based on the hub measure, it is determined if the data object is a hub, where the hub is representative of a cluster of similar data objects.

At 608, an incrementally updated computer generated visual rendition of hubs and respective clusters for the data stream is provided via the processor to a computing device.

At 610, data objects that include the data object in their respective ranked neighbor lists are identified.

At 612, the reverse neighbor lists for the received data objects are updated by including the identified data objects in the reverse neighbor list for the data object.

Examples of the disclosure provide a generalized system for incremental clustering of a data stream via an orthogonal transform based indexing. The generalized system addresses business challenges of growing costs incurred in data storage, analytic processing and data communications, when data volumes are disproportionately high compared to utility in generating valuable insight. The key proposition is to form clusters around data points that appear in the nearest neighbor lists of many other data points, after the arrival of every new data object in a data stream. This is generally achieved by maintaining an incrementally updated index, incrementally updated ranked neighbor lists for each data object, and reverse neighbor lists for each data object. The generalized system described herein may work with any kind of categorical and/or numerical data as long as a similarity measure/distance measure may be defined for these data objects. Also, for example, clustering techniques, as described herein, may be utilized to support classification and recommender systems.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A system comprising:
an indexing module to retrieve, via a processor, a ranked neighbor list for a data object in a data stream, wherein the ranked list is based on an orthogonal transform based indexing of an incrementally updated nearest neighbor graph reflecting additional data objects arriving in the data stream;
a reverse neighbor determination module to identify, via the processor, a reverse neighbor list for the data object, wherein the reverse neighbor list comprises previously received data objects that include the data object in their respective ranked lists;
an evaluator to determine a hub measure for the data object, wherein the hub measure is a size of the reverse neighbor list for the data object; and
a hub identification module to determine, based on the hub measure, if the data object is a hub, wherein the hub is representative of a cluster of similar data objects.

2. The system of claim 1, wherein the hub identification module is to determine that the data object is a hub based on a determination that the data object is not similar to an existing hub.

3. The system of claim 2, wherein the determination that the data object is not similar to the existing hub is based on a size of an overlap of the reverse neighbor list for the data object with a reverse neighbor list for the existing hub.

4. The system of claim 1, wherein based upon a determination that the data object is a hub, the hub identification module is to modify existing clusters.

5. The system of claim 4, wherein the hub identification module is to modify the existing clusters by generating a new cluster with the data object as the hub, wherein the new cluster is generated by:
including all data objects in the ranked neighbor list for the data object;

identifying a k-th neighbor in the ranked neighbor list for the data object; and including, in the new cluster, additional data objects of the received data objects that are closer to the data object than the k-th neighbor.

6. The system of claim 1, wherein based upon a determination that the data object is not a hub, the hub identification module is to associate the data object with an existing cluster.

7. The system of claim 1, wherein the hub identification module is to provide, via the processor to a computing device, an incrementally updated computer generated visual rendition of hubs and respective clusters for the data stream.

8. The system of claim 1, wherein the ranked neighbor list for the data object comprises top k nearest neighbors.

9. The system of claim 8, wherein the reverse neighbor determination module is to update, via the processor, reverse neighbor lists for the received data objects by including the data object in reverse neighbor lists for the top k nearest neighbors of the data object.

10. The system of claim 8, wherein the reverse neighbor determination module is to update, via the processor, reverse neighbor lists for the received data objects by:
identifying data objects that include the data object in their respective ranked neighbor lists; and
including the identified data objects in the reverse neighbor list for the data object.

11. A method comprising:
retrieving, via a processor, a ranked neighbor list for a data object in a data stream, wherein the ranked list is based on an orthogonal transform based indexing of an incrementally updated nearest neighbor graph reflecting additional data objects arriving in the data stream;
identifying, via the processor, a reverse neighbor list for the data object, wherein the reverse neighbor list comprises previously received data objects that include the data object in their respective ranked lists;
determining, via the processor, a hub measure for the data object, wherein the hub measure is a size of the reverse neighbor list for the data object;
determining, based on the hub measure, if the data object is a hub, wherein the hub is representative of a cluster of similar data objects; and
providing, via the processor to a computing device, an incrementally updated computer generated visual rendition of hubs and respective clusters for the data stream.

12. The method of claim 11, comprising:
determining that the data object is a hub based on a determination that the data object is not similar to an existing hub; and
modifying existing clusters by generating a new cluster with the data object as the hub, wherein the new cluster is generated by:
including all data objects in the ranked neighbor list for the data object;
identifying a k-th neighbor in the ranked neighbor list for the data object; and
including, in the new cluster, additional data objects of the received data objects that are closer to the data object than the k-th neighbor.

13. The method of claim 11, comprising updating, via the processor, reverse neighbor lists for the received data objects by:
identifying data objects that include the data object in their respective ranked neighbor lists; and
including the identified data objects in the reverse neighbor list for the data object.

14. A non-transitory computer readable medium comprising executable instructions to:
retrieve, via a processor, a ranked neighbor list for a data object in a data stream, wherein the ranked list is based on an orthogonal transform based indexing of an incrementally updated nearest neighbor graph reflecting additional data objects arriving in the data stream;
identify, via the processor, a reverse neighbor list for the data object, wherein the reverse neighbor list comprises previously received data objects that include the data object in their respective ranked lists;
determine, via the processor, a hub measure for the data object, wherein the hub measure is a size of the reverse neighbor list for the data object;
determine, based on the hub measure, if the data object is a hub, wherein the hub is representative of a cluster of similar data objects; and
modify existing clusters based on the determination if the data object is or is not a hub.

15. The non-transitory computer readable medium of claim 14, comprising instructions to determine that the data object is a hub based on a determination that the data object is not similar to an existing hub.

16. The non-transitory computer readable medium of claim 14, comprising instructions to modify existing clusters with the data object as the hub.

17. The non-transitory computer readable medium of claim 16, comprising instructions to modify existing clusters by generating a new cluster with the data object as the hub.

18. The non-transitory computer readable medium of claim 16, comprising instructions to generate the new cluster by:
including all data objects in the ranked neighbor list for the data object;
identifying a k-th neighbor in the ranked neighbor list for the data object; and
including, in the new cluster, additional data objects of the received data objects that are closer to the data object than the k-th neighbor.

* * * * *